US008475956B2

(12) United States Patent
Kusachi et al.

(10) Patent No.: US 8,475,956 B2
(45) Date of Patent: Jul. 2, 2013

(54) POLYRADICAL COMPOUND-CONDUCTIVE MATERIAL COMPOSITE, METHOD FOR PRODUCING THE SAME, AND BATTERY USING THE SAME

(75) Inventors: Yuki Kusachi, Tokyo (JP); Masahiro Suguro, Tokyo (JP); Shigeyuki Iwasa, Tokyo (JP)

(73) Assignee: NEC Corporation, Tokyo (JP)

( * ) Notice: Subject to any disclaimer, the term of this patent is extended or adjusted under 35 U.S.C. 154(b) by 737 days.

(21) Appl. No.: 12/523,762

(22) PCT Filed: Jan. 21, 2008

(86) PCT No.: PCT/JP2008/050676
§ 371 (c)(1),
(2), (4) Date: Jul. 20, 2009

(87) PCT Pub. No.: WO2008/090832
PCT Pub. Date: Jul. 31, 2008

(65) Prior Publication Data
US 2010/0009256 A1    Jan. 14, 2010

(30) Foreign Application Priority Data

Jan. 25, 2007 (JP) .................................. 2007-014997

(51) Int. Cl.
*H01M 4/60* (2006.01)
(52) U.S. Cl.
USPC ........... 429/213; 429/176; 525/55; 525/327.1
(58) Field of Classification Search
USPC .......................... 429/213, 176; 525/55, 327.1
See application file for complete search history.

(56) References Cited

U.S. PATENT DOCUMENTS

| 4,442,187 | A | 4/1984 | MacDiarmid et al. |
| 4,833,048 | A | 5/1989 | Dejonghe et al. |
| 6,287,722 | B1 * | 9/2001 | Barton et al. ................. 429/176 |
| 6,641,759 | B1 | 11/2003 | Harada et al. |

FOREIGN PATENT DOCUMENTS

| JP | 2715778 | | 11/1997 |
| JP | 2001-118570 | * | 4/2001 |
| JP | 2001-118750 | | 4/2001 |
| JP | 2002-075333 | * | 3/2002 |

(Continued)

OTHER PUBLICATIONS

International Search Report—PCT/JP2008/050676—Mar. 18, 2008.

(Continued)

*Primary Examiner* — Peter D. Mulcahy
*Assistant Examiner* — Henry Hu
(74) *Attorney, Agent, or Firm* — Young & Thompson

(57) ABSTRACT

An exemplary embodiment provides: a composite of an electrode active material and an electric conductivity-imparting agent, which has a high capacity density and can produce a large current; a method for producing it; and a battery which has a high energy density and can produce a large output. Specifically, a polyradical compound as the electrode active material and a conductive material are heated and mixed at a temperature of not less than the softening temperature of the polyradical compound and less than the decomposition temperature thereof to form a composite of the polyradical compound and the conductive material. Fabricating an electrode using the composite can provide a novel battery having a high energy density and a large output.

16 Claims, 1 Drawing Sheet

FOREIGN PATENT DOCUMENTS

| | | | |
|---|---|---|---|
| JP | 2002-151084 | | 5/2002 |
| JP | 2002-298850 | * | 10/2002 |
| JP | 2002-304996 | | 10/2002 |
| JP | 2002-313344 | * | 10/2002 |
| JP | 2003-073321 | | 3/2003 |
| JP | 2003-292309 | | 10/2003 |
| JP | 2006-073240 | * | 3/2006 |
| JP | 2007-213992 | * | 8/2007 |
| WO | 2004/077593 | | 9/2004 |
| WO | 2006/061948 | | 6/2006 |
| WO | WO-2006/061948 A1 | * | 6/2006 |

OTHER PUBLICATIONS

Ann.,—601, 81-111 (1956).
Warren H. Watanabe et al.—Journal of the American Chemical Society, vol. 79—pp. 2828-2833—(1957).
Yoshio Okimoto et al.—Development of a Highly Efficient Catalytic Method for Synthesis of Vinyl Ethers—Journal of the American Chemical Society—vol. 124—pp. 1590-1591—(2002).
Chinese Office Action dated Jan. 27, 2011 in corresponding Chinese Application No. 200880002974.6 with English translation of Office Action.

* cited by examiner

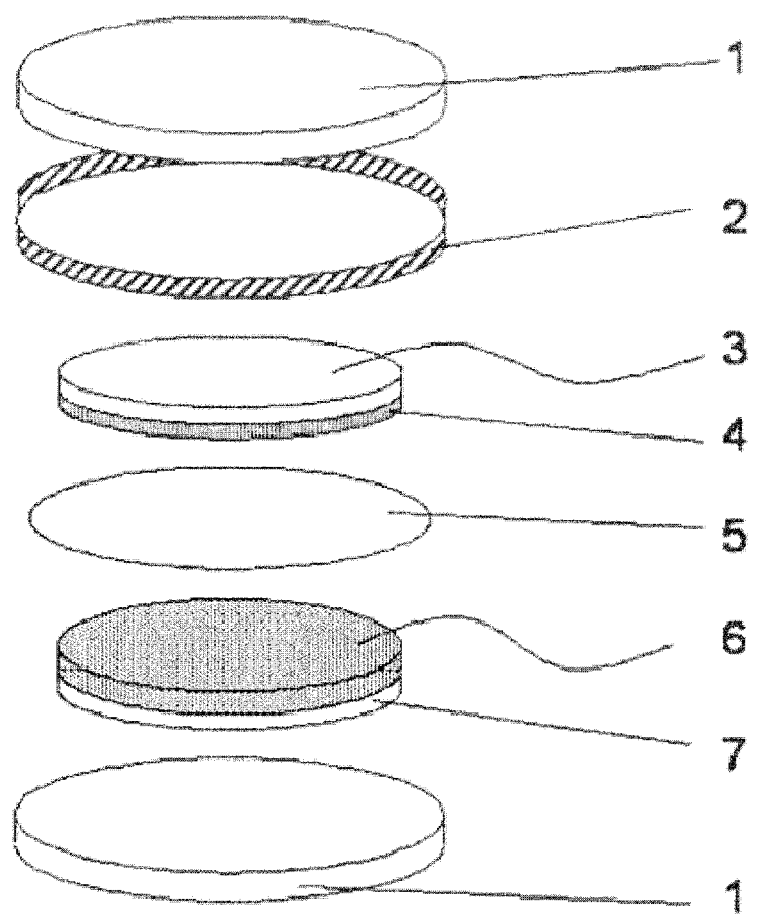

POLYRADICAL COMPOUND-CONDUCTIVE MATERIAL COMPOSITE, METHOD FOR PRODUCING THE SAME, AND BATTERY USING THE SAME

TECHNICAL FIELD

The present invention relates to: a composite of an electrode active material and an electric conductivity-imparting agent, which has a high capacity density and can produce a large current; a method for producing it; and a battery which has a high energy density and can produce a large output.

BACKGROUND ART

In recent years, mobile electronic devices such as notebook computers and mobile phones have rapidly spread along with the development of communication systems and their performances also have improved year by year. Particularly, mobile devices are likely to have a larger power consumption along with the improvement in their performances. Then, batteries as their power source are increasingly required to have a high energy density, a large output and the like.

As batteries having a high energy density, lithium ion batteries have been developed, and widely used since the 1990s. For example, in the lithium ion batteries, a lithium-containing transition metal oxide such as lithium manganate or lithium cobaltate is used as an electrode active material for the cathode and carbon is used as an electrode active material for the anode, and charging/discharging is performed utilizing the intercalation/deintercalation reactions of lithium ions into/from the electrode active materials. Such lithium ion batteries have a high energy density and excel in cycle characteristics, and are utilized for various types of electronic devices including mobile phones. However, since the reaction rate of the electrode reaction is low, the battery performances remarkably decrease if a large current is extracted. Hence, the lithium ion batteries have a difficulty in producing a large output, and have a drawback of requiring a long time for charging.

As power storage devices capable of producing a large output, electric double-layer capacitors are known. The electric double-layer capacitors can produce a large output since they can output a large current at one time. They have excellent cycle characteristics and have been developed as a backup power source. However, they have a very low energy density, and have a difficulty in being downsized, so they are not suitable for a power source for mobile electric devices.

In order to provide an electrode material which is light and has a large energy density, also batteries using a sulfur compound or an organic compound as an electrode active material have been developed. For example, Patent Document 1 (U.S. Pat. No. 4,833,048) and Patent Document 2 (Japanese Patent No. 2715778) disclose a battery using an organic compound having disulfide bonds for the cathode. This utilizes as the principle of the battery an electrochemical redox reaction involving generation and dissociation of the disulfide bonds. Since this battery is constituted of electrode materials containing as main ingredients elements having a small specific gravity, such as sulfur and carbon, it serves for a certain effect in view of a high-energy density and large-capacity battery. However, since rebonding of the dissociated bonds exhibits a small efficiency and the electrode active material diffuses in an electrolyte, the battery has a drawback of easily decreasing in the capacity when the charge/discharge cycle is repeated.

Further as a battery utilizing an organic compound a battery using a conductive polymer as an electrode material is proposed. The battery is one utilizing as the principle the doping/dedoping reactions of electrolyte ions to/from the conductive polymer. The doping reaction refers to a reaction to stabilize charged radicals generated by oxidation or reduction of a conductive polymer, with counter ions. Patent Document 3 (U.S. Pat. No. 4,442,187) discloses a battery using such a conductive polymer as a cathode or anode material. This battery is constituted only of elements having a small specific gravity, such as carbon and nitrogen, and was expected as a high-capacity battery. However, the conductive polymer has a characteristic that charged radicals generated by redox delocalize over a broad rage of the $\pi$ electron conjugate system, and interact to cause electrostatic repulsion and radical extinction. This putts a limitation on charged radicals generated, i.e., the doping concentration, and putts a limitation on the capacity of a battery. For example, it is reported that a battery using polyaniline as a cathode has a doping ratio of not more than 50% and a battery using polyacetylene has that of 7%. Although a battery using a conductive polymer as an electrode material serves for a certain effect in view of weight reduction, the battery having a large energy density has not been provided.

As a battery using an organic compound as an electrode active material of the battery, one using a redox reaction of a radical compound is proposed. For example, Patent Document 4 (Japanese Patent Application Laid-Open No. 2002-151084) discloses organic radical compounds, such as nitroxide radical compounds, aryloxy radical compounds and polymeric compounds having a specified aminotriazine structure, as an active material, and a battery using the organic radical compound as a material for a cathode or an anode. Further, Patent Document 5 (Japanese Patent Application Laid-Open No. 2002-304996) discloses a power storage device using a nitroxide compound, particularly a compound having a cyclic nitroxide structure, as an electrode active material. The polyradical compound used there as an electrode active material is synthesized by reacting and polymerizing 2,2,6,6-tetramethylpiperidine methacrylate with azobisisobutyronitrile as a polymerization initiator, and thereafter oxidizing the polymer using m-chloroperbenzoic acid. On the other hand, Patent Document 6 (Japanese Patent Application Laid-Open No. 2002-313344) discloses also a battery using a nitroxyl radical polymer being a polyradical compound as a binder for an electrode.

Meanwhile, electrodes of batteries generally contain an electric conductivity-imparting agent to enhance electron conductivity other than the active material. Proposals are made to provide batteries having a high energy density and a high output by compositing an active material and an electric conductivity-imparting agent to effectively make up for the low electron conductivity of the active material. For example, Patent Document 7 (Japanese Patent Application Laid-Open No. 2003-292309) discloses a composite in which the surface of particles composed of lithium iron phosphate is coated with a conductive carbon.

On the other hand, as a method for fabricating an electrode for a polymer secondary battery, a heat press method is disclosed. Patent Document 8 (Japanese Patent Application Laid-Open No. 001-118570) discloses an electrode producing method in which a mixed powder of a polymer active material powder and an electric conduction-aiding agent powder is heat pressed.

Patent Document 9 (Japanese Patent Application Laid-Open No. 2002-298850) discloses a battery in which an active material containing a radical compound is particles composed of two or more compositions. It is contended that coating the surface of a conductive material with a radical compound enlarge the surface area of the radical compound and can provide a high output density. However, the case of coating a conductive material with a radical compound cannot provide a sufficient output density because electron conduction paths of the conductive material are not formed externally. Patent Document 9 further contends that binding a radical compound and a conductive material with a polymeric material holds the binding even if particles are deformed in battery operation and provides an excellent cycle life. However, there arises a problem that the polymeric material used as a binder lacks electron conductivity, causing an increase in the electrode resistance and causing a decrease in the output density.

Patent Document 1: U.S. Pat. No. 4,833,048
Patent Document 2: Japanese Patent No. 2715778
Patent Document 3: U.S. Pat. No. 4,442,187
Patent Document 4: Japanese Patent Application Laid-Open No. 2002-151084
Patent Document 5: Japanese Patent Application Laid-Open No. 2002
Patent Document 6: Japanese Patent Application Laid-Open No. 2002-313344
Patent Document 7: Japanese Patent Application Laid-Open No. 2003-292309
Patent Document 8: Japanese Patent Application Laid-Open No. 2001-118570
Patent Document 9: Japanese Patent Application Laid-Open No. 2002-298850

DISCLOSURE OF THE INVENTION

Problems to be Solved by the Invention

As describe heretofore, lithium ion batteries using a transition metal oxide as a cathode have a difficulty in producing batteries having a high energy density per weight and capable of providing a high output. Electric double-layer capacitors have a high output, but have a low energy density per weight and a difficulty in capacity enhancement. Further, batteries utilizing a sulfur compound or a conductive organic compound as an electrode active material cannot yet provide batteries having a high energy density.

Further, batteries using a redox reaction of an organic radical compound have a problem that they cannot be produced simply because the producing method of the batteries generate cracks in the electrodes, and a problem that the whole does not contribute to charge/discharge because of a low electron conductivity of the organic radical polymer, lowering the energy density. Therefore, a simpler and novel process for producing the electrode is desired.

It is an object of the present invention to provide: a composite of an electrode active material and an electric conductivity-imparting agent, which has a high capacity density and can produce a large current; a method for producing it; and a battery which has a high energy density and can produce a large output.

Means for Solving the Problems

The present invention is a method for producing a polyradical compound-conductive material composite, comprising the step of heating and mixing a polyradical compound and a conductive material at a temperature of not less than the softening temperature of the polyradical compound and less than the decomposition temperature thereof.

Further, the present invention is a polyradical compound-conductive material composite produced by the above-mentioned method.

Further, the present invention is a battery comprising, at least, a cathode, an anode and an electrolyte as constituting elements, wherein the above-mentioned polyradical compound-conductive material composite is used for at least one of the cathode and the anode.

Effect of the Invention

The present invention can provide: a composite of an electrode active material and an electric conductivity-imparting agent, which has a high capacity density and can produce a large current; a method for producing it; and a battery which has a high energy density and can produce a large output.

BRIEF DESCRIPTION OF THE DRAWING

FIG. 1 is a schematic diagram showing an example of the constituents of the battery according to an exemplary embodiment.

DESCRIPTION OF SYMBOLS

| | |
|---|---|
| 1 | SUS EXTERIOR PACKAGE |
| 2 | INSULATING PACKING |
| 3 | ANODE CURRENT COLLECTOR |
| 4 | ANODE |
| 5 | SEPARATOR |
| 6 | CATHODE |
| 7 | CATHODE CURRENT COLLECTOR |

BEST MODE FOR CARRYING OUT THE INVENTION

As a result of exhaustive studies, the present inventors have found that a polyradical compound has a softening temperature at a temperature less than its decomposition temperature and the utilization of a temperature range where the compound is softened can solve the above-mentioned problems. That is, according to an exemplary embodiment, a composite of a polyradical compound and a conductive material is produced by heating and mixing the polyradical compound as an electrode active material and a conductive material at a temperature of not less than the softening temperature of the polyradical compound and less than the decomposition temperature thereof; and a novel secondary battery having a high energy density and a large output (more specifically, capable of discharging a large current) can be provided by fabricating electrodes by using the composite. Particularly, using as an electrode active material a polyradical compound having a partial structure represented by the following general formula (1):

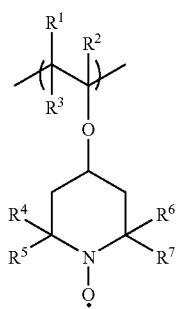

(1)

wherein $R^1$ to $R^3$ are each independently hydrogen atom, or methyl group; and $R^4$ to $R^7$ are each independently an alkyl group having 1 to 3 carbon atoms, and making a novel battery utilizing redox of the site can provide a novel battery which has a high energy density and can produce a large output.

In an exemplary embodiment, it suffices if the polyradical compound contributes directly to the electrode reaction at the cathode or the anode, and the electrode to be used as an electrode active material is not limited to one of the cathode and the anode. However, in view of the energy density, especially a polyradical compound having a partial structure represented by the general formula (1) is preferably used as an electrode active material of the cathode. The battery according to an exemplary embodiment is preferably a lithium battery, particularly a lithium secondary battery, using carbon to/from which metal lithium or lithium ions can be intercalated/deintercalated for the anode.

An exemplary embodiment is a proposed novel battery using a composite of an electrode active material containing a polyradical compound having a softening temperature, and a conductive material. Accordingly, a battery which has a high energy density and can produce a large output can be provided. Therefore, according to an exemplary embodiment, a battery comprising light and safe elements containing no heavy metal as an electrode active material can be fabricated; and a battery which has a high capacity (per weight) and excels in the stability of the charge/discharge cycle, and can further produce a large output can be achieved.

FIG. 1 shows a constitution of an example of a battery according to an exemplary embodiment. The battery shown in FIG. 1 has a constitution in which a cathode 6, and an anode 4 disposed on an anode current collector 3 are stacked facing each other through a separator containing an electrolyte, and a cathode current collector 7 is stacked on the cathode 6.

These are packaged with a SUS exterior package 1 on the anode side and a SUS exterior package 1 on the cathode side; and between the packages, an insulating packing 2 comprising an insulating material such as a plastic resin is disposed in order to prevent the electric contact between both the packages. In the case of using a solid electrolyte or a gel electrolyte as an electrolyte, a form may be employed in which such an electrolyte is interposed between the electrodes in place of the separator 5.

An exemplary embodiment, in such a constitution, uses a composite of a polyradical compound and a conductive material described later for the anode 4, the cathode 6, or both the electrodes.

A battery according to an exemplary embodiment is preferably a lithium battery, particularly a lithium secondary battery, using the above-mentioned composite for the cathode in view of the battery capacity.

[1] Electrode Active Material

An electrode active material of an electrode in an exemplary embodiment refers to a material contributing directly to the electrode reaction including the charging reaction and the discharging reaction, and performs a major function of a battery system.

In an exemplary embodiment, a polyradical compound is used as an electrode active material but especially preferably used is a polyradical compound having a partial structure represented by the general formula (1):

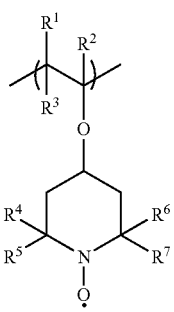

(1)

wherein $R^1$ to $R^3$ are each independently hydrogen atom, or methyl group; and $R^4$ to $R^7$ are each independently an alkyl group having 1 to 3 carbon atoms.

In the above general formula (1), $R^4$ to $R^7$ are preferably each independently methyl group or ethyl group.

An electrode active material in the battery of an exemplary embodiment may be in a fixed state to the electrode, or may be in a dissolved or dispersed state in the electrolyte. Here, in the case of using the electrode active material in a fixed state to the electrode, in order to suppress a decrease in the capacity due to the dissolution in the electrolytic solution, the electrode active material is preferably in a solid state and further insoluble or poorly soluble in the electrolytic solution. Here, the electrode active material may swell as long as it is insoluble or poorly soluble in the electrolytic solution. This is because, in the case of a high solubility thereof in the electrolytic solution, dissolution of the electrode active material from the electrode to the electrolytic solution decreases the capacity along with the charge/discharge cycle in some cases.

Hence, a polyradical compound having a partial structure represented by the general formula (1) has a number-average molecular weight of preferably not less than 500, more preferably not less than 5,000, still more preferably not less than 10,000, especially preferably not less than 40,000, and most preferably not less than 70,000. This is because the polyradical compound having a number-average molecular weight of not less than 500 can hardly be dissolved in an electrolytic solution for a battery and further that of not less than 5,000 is nearly insoluble therein. Its shape may be any of being linear, branched, and networked. The upper limit of the number-average molecular weight is not especially limited, but on the convenience of the synthesis, the polyradical compound can suitably be used which has a number-average molecular weight of not more than 5,000,000, more preferably not more than 1,000,000, still more preferably not more than 200,000, and especially preferably not more than 100,000. Further, the polyradical compound may have a structure of being crosslinked with a crosslinking agent. Here, the above-mentioned number-average molecular weight is defined as a value calculated through measurement of DMF-soluble portions of samples by GPC using dimethylformamide (DMF) as an eluate.

The polyradical compound having a partial structure represented by the general formula (1) has a softening temperature (glass transition temperature) of preferably not less than 80° C., and more preferably not less than 100° C., on the convenience of the electrode producing process, the using conditions and the like. The upper limit of the softening temperature is not especially limited, but the softening temperature is preferably not more than 200° C., more preferably not more than 180° C., still more preferably not more than 160° C., and especially preferably not more than 150° C., on the convenience of the process for producing a composite of a polyradical compound and a conductive material. Here, the softening temperature is defined as one at which a material starts to shrink in TMA of a temperature-rising rate of 2° C./min and a load of 100 mN.

The polymer described above to be used may be a homopolymer which has only a partial structure represented by the general formula (1) as a repeating unit structure, or may be a copolymer which further has another partial structure as a repeating unit structure. On the convenience of the synthesis, a homopolymer is preferable. In the case of a copolymer, the partial structure represented by the general formula (1) is preferably 70 to 99 mol %, and more preferably 80 to 95 mol %, with respect to the total of the polymeric compound.

Examples of the partial structure represented by the general formula (1) include partial structures represented by the following formulas (2) to (5):

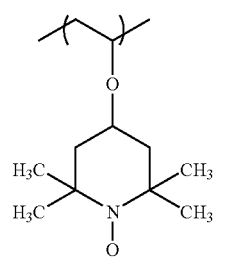

(2)

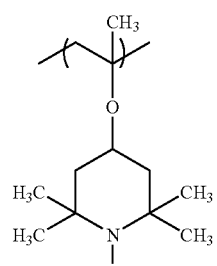

(3)

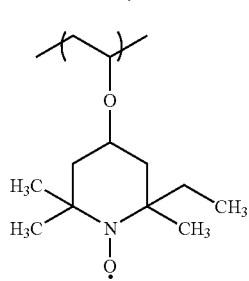

(4)

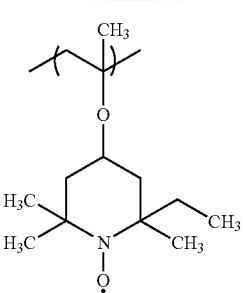

(5)

The polyradical compound having a partial structure represented by the formula (2) shown above is synthesized, for example, through a route shown in the synthesis scheme (12) shown below. That is, the synthesis can be carried out by a method in which a radical-substituted vinyl ether compound is cationically polymerized in the presence of a cationic polymerization catalyst. A polyradical compound can be synthesized by polymerizing 2,2,6,6-tetramethylpiperidine-4-vinyloxy-1-oxyl using, for example, boron trifluoride diethyl ether complex as a cationic polymerization catalyst. Compounds represented by the formulas (2) to (5) shown above can also be synthesized by the similar method.

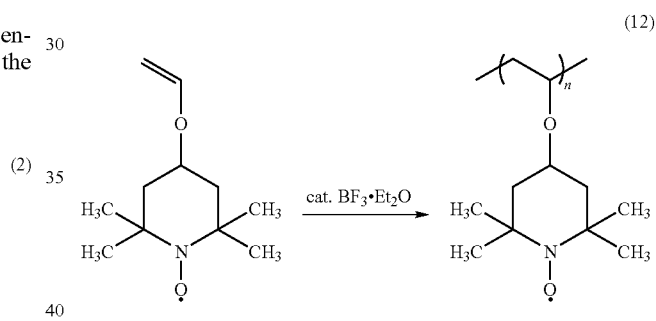

(12)

As a cationic polymerization catalyst used in the polymerization, other than the above, catalysts used in typical cationic polymerization can be used, but Lewis acids are preferably used. Protonic acids can be used as a cationic polymerization catalyst, but in this case, the polymerization is carried out preferably under the condition where they do not cause a side reaction with a monomer containing radicals. aluminum chloride, tin tetrachloride, iron chloride or the like can be used as a Lewis acid. Further, catalysts and the like can be used which are combinations of a transition metal compound such as tin tetrachloride, titanium tetrachloride, titanium trichloride, vanadium tetrachloride and vanadium trichloride oxide, and an organometal compound of a typical metal such as triethylaluminum, ethylaluminum dichloride, triethyloxonium hexafluoroborate. In this case, a target polyradical compound can be synthesized through a synthesis scheme, raw materials to be used, reaction conditions and the like, which are suitably altered, and a combination with a well-known synthesis technology. The polymerization is carried out preferably in an organic solvent. Further, in view of the solubility of a monomer, it is carried out preferably in a halogenic organic solvent. A halogenic organic solvent to be preferably used is dichloromethane or chloroform.

Here, vinyl ether monomers used in the synthesis of polyradical compounds described above can be synthesized using the following methods. For example, as described in "W. Reppe, et al., Annaien der Chemie, vol. 601, pp. 81-111 (1956)", a vinyl ether monomer can be synthesized by reacting acetylene and a corresponding alcohol in the presence of a catalytic amount of potassium hydroxide and sodium hydroxide at a pressure (about 20 to 50 atm) and at a high temperature (180 to 200° C.). As described in "Warren H., et al., Journal of the American Chemical Society, vol. 79, pp. 2828-2833 (1957)", a vinyl ether monomer can be synthesized by heating and refluxing a corresponding alcohol and an alkyl vinyl ether in the presence of mercuric acetate as a catalyst. Further, as described in "Y. Ishii, et al., Journal of the American Chemical Society, vol. 124, pp. 1590-1591 (2002)" and Japanese Patent Laid-Open No. 2003-73321, a vinyl ether monomer can also be synthesized by heating and refluxing a corresponding alcohol and vinyl acetate in the presence of iridium as a catalyst.

The polyradical compound may be used singly or in combination of two or more. Further, they may be used in a combination with another electrode active material.

In the case where a polyradical compound having a partial structure represented by the general formula (1) is used for a cathode, as the other electrode active material, a metal oxide, a disulfide compound, another stable radical compound, a conductive polymer or the like can be combined. Here, examples of the metal oxide include lithium manganates or lithium manganate having a spinel structure, such as $LiMnO_2$ and $Li_xMn_2O_4$ (0<x<2), $MnO_2$, $LiCoO_2$, $LiNiO_2$ and $Li_yV_2O_5$ (0<y<2), $LiFePO_4$, which is an olivine material, and $LiNi_{0.5}Mn_{1.5}O_4$, $LiCr_{0.5}Mn_{1.5}O_4$, $LiCo_{0.5}Mn_{1.5}O_4$, $LiCoMnO_4$, $LiNi_{0.5}Mn_{0.5}O_2$, $LiNi_{0.33}Mn_{0.33}Co_{0.33}O_2$, $LiNi_{0.8}Co_{0.2}O_2$ and $LiN_{0.5}Mn_{1.5-z}Ti_zO_4$ (0<z<1.5), which are each a material obtained by substituting another transition metal for a part of Mn in a spinel structure. Examples of the disulfide compound include dithioglycol, 2,5-dimercapto-1,3,4-thiadiazole and S-triazine-2,4,6-trithiol. Examples of the other stable radical compound include poly(2,2,6,6-tetramethylpiperidinoxyl-4-yl methacrylate). Examples of the conductive polymer include polyacethylene, polyphenylene, polyaniline and polypyrrole. The polyradical compound is preferably used in combinations, particularly, with lithium manganate or $LiCoO_2$ among these other electrode active materials. In an exemplary embodiment, the other electrode active material may be used singly or in combination of two or more.

In the case where a polyradical compound having a partial structure represented by the general formula (1) is used for a anode, as another electrode active material, graphite, amorphous carbon, metal lithium, a lithium alloy, lithium ion-occluding carbon, sodium metal, a conductive polymer or the like can be used. Another stable radical compound may be used. Examples of the other stable radical compound include poly(2,2,6,6-tetramethylpiperidinoxyl-4-yl methacrylate) Their shape is not especially limited; for example, the shape of metal lithium is not limited to being thin film-like, and may be bulky, tamped-powdery, fibrous, flaky or the like. The polyradical compound is preferably used in combinations, particularly, with metal lithium or graphite among these other electrode active materials. the other electrode active material may be used singly or in combination of two or more.

In the case where a polyradical compound having a partial structure represented by the general formula (1) is used only for one of the electrodes, as an electrode active material for the other electrode, the above-mentioned other electrode active material can be used.

[2] Electric Conductivity-Imparting Agent (Auxiliary Electric Conduction Materials), and Ionic Conduction Auxiliary Material In the case of forming an electrode using a polyradical compound, in order to reduce the impedance and improve the energy density and output characteristics, a conductive material to be an electric conductivity-imparting agent (an auxiliary electric conduction material) or an ionic conduction auxiliary material is used. In these materials, examples of the conductive material to be the auxiliary electric conduction material include carbonaceous microparticles, such as graphite, carbon black and acetylene black, and carbon materials of carbon fibers, such as vapor grown carbon fibers (VGCF) and carbon nanotubes; conductive polymers such as polyaniline, polypyrrole, polythiophene, polyacethylene and polyacene; micropowder of metal oxides, such as oxides of Sn, Ti, In and the like; and metal powder, such as Au, Ag, Pt and Al. Examples of the conductive material to be the ionic conduction auxiliary material include polymeric gel electrolytes and polymeric solid electrolytes. Above all, a carbon fiber is preferably mixed. Mixture with a carbon fiber raises the tensile strength of the electrode, and reduces cracks and peelings in the electrode. A vapor phase growth carbon fiber is more preferably mixed. The material may be used singly or as a mixture of two or more. The proportion of these materials in the electrode is preferably 10 to 80 wt %.

[3] Producing Method of Polyradical Compound-Conductive Material Composite

A composite is formed in order to make favorable and stable the contact of a polyradical compound and a conductive material to be an electric conductivity-imparting agent. The composite can be provided by mixing the polyradical compound pulverized into powder by a ball mill or a mortar with the electric conductivity-imparting agent, and heating the mixture at a temperature not less than the softening temperature of the polyradical compound. The heating at a temperature not less than the softening temperature of the polyradical compound develops the adhesiveness of the surface of the polyradical compound and allows the adhesion of the electric conductivity-imparting agent thereto. However, since a polyradical compound is used as an electrode active material, the heating temperature is set at a temperature of less than the decomposition temperature of the polyradical compound. Here, the decomposition temperature is defined as a temperature higher than the softening temperature and starting heat generation by DSC of a temperature-rising rate of 10° C./min.

With respect to the particle diameter of the polyradical compound before the above-mentioned heating and mixing, the average particle diameter is preferably not more than 100 μm, more preferably not more than 50 μm, and still more preferably not more than 15 μm, to provide a more favorable composite which is increased in the contact area. The lower limit thereof is preferably not less than 0.02 μm, and more preferably not less than 0.1 μm. With a too large average particle diameter of the polyradical compound powder since the distance between the electric conductivity-imparting agent adhered to the surface and the center of the polyradical compound is elongated and the charge/discharge is hardly performed effectively, the energy density of a battery decreases in some cases. By contrast, with a too small average particle diameter of the polyradical compound powder, the electric conductivity-imparting agent is hardly fixed to the electrode surface in fabricating electrodes, causing problems such as the capacity reduction and self-discharge in some cases. Here, the average particle diameter of a polyradical compound is defined as a value obtained by a dry type measurement using a particle size distribution analyzer SALD-2200 (trade name), made by Shimadzu Corp.

Details of the producing method are shown hereinafter. Polyradical compound particles and an electric conductivity-imparting agent put in a flask are stirred at ordinary temperature. Then, the flask is heated under stirring up to a temperature not less than the softening temperature of the polyradical complex. The heating at this time can be performed using an oil bath or a mantle heater, but is not limited thereto. At this time, the gas in the flask is preferably replaced by an inert gas such as argon. Then, after the heating in a certain time and at a certain temperature, the system is cooled to room temperature to obtain a composite of the polyradical compound and the electric conductivity-imparting agent. At this time, the composite can be obtained as long as the heating temperature is not less than the softening temperature and not more than the decomposition temperature, but the temperature is more preferably not less than the softening temperature +5° C. and less than the decomposition temperature. This is because a near softening temperature brings about insufficient softening of the polyradical compound and the electric conductivity-imparting agent hardly enters the polyradical interior in some cases. The heating time is preferably for not more than 3 hours, and more preferably for not more than 1 hour. The heating time greater than 3 hours causes a risk of deteriorating the polyradical compound and degrading the battery functions.

Then, to the composite, a particle other than a polyradical compound may be added as an active material for the battery. The electric conductivity-imparting agent may be used singly or in combination of two or more.

In produce of a composite, a kneader such as a twin screw kneader may be used other than the glassware as described above.

[3] Binder

A binder may be used to enhance the binding between constituting materials of the battery. Examples of the binder include resin binders such as polytetrafluoroethylene, polyvinylidene fluoride, vinylidene fluoride-hexafluoropropylene copolymers, vinylidene fluoride-tetrafluoroethylene copolymers, styrene-butadiene copolymerized rubber, polypropylene, polyethylene, polyimide and various types of polyurethanes. The binder may be used singly or as a mixture of two or more. The proportion of a binder in an electrode is preferably 5 to 30 wt %.

[4] Catalyst

A catalyst to aid the redox reaction may be used to smoothly perform the electrode reaction. Examples of the catalyst include conductive polymers such as polyaniline, polypyrrole, polythiophene, polyacetylene and polyacene; basic compounds such as pyridine derivatives, pyrrolidone derivatives, benzimidazole derivatives, benzothiazole derivatives and acridine derivatives; and metal ion complexes. The catalyst may be used singly or as a mixture of two or more. The proportion of a catalyst in an electrode is preferably not more than 10 wt %.

[5] Current Collector and Separator

As an anode current collector and a cathode current collector, a collector, which has a shape of foil, metal flat plate or mesh and which consists of nickel, aluminum, copper, gold, silver, an aluminum alloy, stainless steel, carbon or the like, can be used. A current collector may be made to have a catalytic effect and may be chemically bonded with an electrode active material.

On the other hand, a separator such as a porous film or a nonwoven fabric composed of polyethylene, polypropylene or the like may be used so that the cathode and the anode are not contacted.

[6] Electrolyte

An electrolyte transports charged carriers between a cathode and an anode, and generally has preferably an ionic conductivity of $10^{-5}$ to $10^{-1}$ S/cm at 20° C. As an electrolyte, for example, an electrolytic solution, in which an electrolyte salt is dissolved in a solvent, can be utilized. Examples of the electrolyte salt usable include Li salts, such as $LiPF_6$, $LiClO_4$, $LiBF_4$, $LiCF_3SO_3$, $Li(CF_3SO_2)_2N$, $Li(C_2F_5SO_2)_2N$, $Li(CF_3SO_2)_3C$ and $Li(C_2F_5SO_2)_3C$. The electrolyte salt may be used singly or as a mixture of two or more. Examples of the solvent usable include organic solvents, such as ethylene carbonate, propylene carbonate, dimethyl carbonate, diethyl carbonate, methyl ethyl carbonate, γ-butyrolactone, tetrahydrofuran, dioxolane, sulfolane, dimethylformamide, dimethylacetamide and N-methyl-2-pyrrolidone. The solvent may be used singly or as a mixture of two or more.

Further, as an electrolyte, a solid electrolyte may be used. Examples of a polymeric compound used for the solid electrolyte include vinylidene fluoride polymers such as polyvinylidene fluoride, vinylidene fluoride hexafluoropropylene copolymers, vinylidene fluoride-ethylene copolymers, vinylidene fluoride-monofluoroethylene copolymers, vinylidene fluoride-trifluoroethylene copolymers, vinylidene fluoride-tetrafluoroethylene copolymers and vinylidene fluoride-hexafluoropropylene-tetrafluoroethylene ternary copolymers; acrylonitrile polymers such as acrylonitrile-methyl methacrylate copolymers, acrylonitrile-methyl acrylate copolymers, acrylonitrile-ethyl methacrylate copolymers, acrylonitrile-ethyl acrylate copolymers, acrylonitrile-methacrylic acid copolymers, acrylonitrile-acrylic acid copolymers and acrylonitrile-vinyl acetate copolymers; and polyethylene oxide, ethylene oxide-propylene oxide copolymers and polymers of acrylates thereof and methacrylates thereof. The polymeric compound made to contain an electrolytic solution and to be gelatinized may be used, or only that made to contain an electrolyte salt may be used as it is.

Further as an electrolyte, an ionic liquid may be used. Examples of the ionic liquid include EMI-TFSI which consists of 1-ethyl-3-methylimidazolium (EMI) cation and bis (trifluoromethylsulfonyl)imide (TFSI) anion, and DEME-TFSI which consists of N,N-dimethyl-N-methyl-N-(2-methoxyethyl)ammonium (DEME) cation and TFSI anion, but are not limited thereto and the ionic liquid used in a lithium ion secondary battery can be utilized.

[7] Battery Shape

Shapes of the battery are not especially limited. Examples of the battery shape include those in which an electrode laminate or an electrode wound body is sealed in a metal case, a resin case, a laminate film composed of a metal foil, such as an aluminum foil, and a synthetic resin film, or the like, and is fabricated in a cylindrical, rectangular, coin or sheet shape; but an exemplary embodiment is not limited thereto.

[8] Producing Method of Battery

Producing methods of the battery are not especially limited and a method selected suitably depending on the materials can be used. For example, there is a method in which an electrode active material-electric conductivity-imparting agent composite, an additional electric conductivity-imparting agent and the like are added with a dispersant, made into a slurry, and applied on an electrode current collector; and the dispersant is volatilized by heating the applied slurry or at ordinary temperature to fabricate an electrode; further, the electrode and a counter electrode are made to interpose a separator, laminated or wound, and enclosed in exterior packages; and the resultant is impregnated with an electrolytic solution, and sealed. Examples of the dispersant to make the slurry include water; ether solvents such as tetrahydrofuran, diethyl ether and ethylene glycol dimethyl ether; amine solvents such as N,N-dimethylformamide and N-methylpyrrolidone; aromatic hydrocarbon solvents such as benzene, toluene and xylene; aliphatic hydrocarbon solvents such as hexane and heptane; halogenated hydrocarbon solvents such as chloroform, dichloromethane, dichloroethane, trichloroethane and carbon tetrachloride; alkyl ketone solvents such as acetone and methyl ethyl ketone; alcoholic solvents such as methanol, ethanol and isopropyl alcohol; and dimethyl sulfoxide. As a fabricating method of the electrode, there is also a method in which an electrode active material-electric conductivity-imparting agent composite, a binder and the like are kneaded in a dry state, and thereafter, the mixture is made into a thin film, and laminated on an electrode current collector.

In an exemplary embodiment, the other producing conditions, which include extraction of leads from the electrodes and making an exterior package, are not limited.

EXAMPLES

Hereinafter, details of an exemplary embodiment will be described specifically by way of Producing Examples and Examples, but the scope of an exemplary embodiment is not limited to these Examples.

Producing Example 1

A polyradical compound-electric conductivity-imparting agent composite using a polyradical compound (PTVE) having a partial structure represented by the formula (2) shown below was produced by a producing scheme described below. The polyradical compound (PTVE) was a homopolymer having only the partial structure represented by the formula (2) shown below, and had a number average molecular weight of 80,000. The polyradical compound (PTVE) had a softening temperature of 110° C. and a decomposition temperature of 150° C.

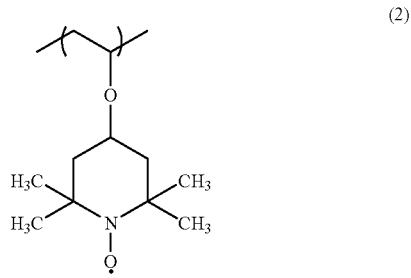

(2)

The polyradical compound (PTVE) was pulverized for 24 hours using an automatic agate mortar. Then, the particles were classified using a SUS sieve having a mesh size of 50 μm to remove PTVE having a large particle diameter. The average particle diameter of the PTVE after the particle diameter adjustment by the classification was 21.8 μm. Then, 7 g of the PTVE after the particle diameter adjustment and 2.5 g of a vapor grown carbon fiber (VGCF) were added to a three-neck round-bottom flask of 200 mL under an atmosphere of argon and were homogeneously stirred. Then, the mixture was heated at 135° C. in an oil bath under stirring. The mixture was heated and stirred for 1 hour, and thereafter cooled to room temperature to obtain a polyradical compound-electric conductivity-imparting agent composite (a) having a weight ratio of PTVE:VGCF=70:25. By observation of the obtained composite (a) by an electron microscope, it is confirmed that the composite was formed in which VGCF adhered to the PTVE particle surface and a part thereof penetrated into the interior of the PTVE.

Producing Example 2

A polyradical compound-electric conductivity-imparting agent composite using a polyradical compound (PTVE, the same as that used in Producing Example 1) having a partial structure represented by the formula (2) was produced by a producing scheme described below.

The polyradical compound (PTVE) was pulverized for 24 hours using an automatic agate mortar. Then, the particles were classified using a SUS sieve having a mesh size of 30 μm to remove PTVE having a large particle diameter. The average particle diameter of the PTVE after the particle diameter adjustment by the classification was 14.4 μm. Then, 7 g of the PTVE after the particle diameter adjustment and 2.5 g of a vapor grown carbon fiber (VGCF) were added to a three-neck round-bottom flask of 200 mL under an atmosphere of argon and were homogeneously stirred. Then, the mixture was heated at 135° C. in an oil bath under stirring. The mixture was heated and stirred for 1 hour, and thereafter cooled to room temperature to obtain a polyradical compound-electric conductivity-imparting agent composite (b) having a weight ratio of PTVE:VGCF=70:25. By observation of the obtained composite (b) by an electron microscope, it is confirmed that the composite was formed in which VGCF adhered to the PTVE particle surface and a part thereof penetrated into the interior of the PTVE.

Producing Example 3

A polyradical compound-electric conductivity-imparting agent composite using a polyradical compound (PTVE, the same as that used in Producing Example 1) having a partial structure represented by the formula (2) was produced by a producing scheme described below.

The polyradical compound (PTVE) was pulverized for 24 hours using an automatic agate mortar. Then, the particles were classified using a SUS sieve having a mesh size of 50 μm to remove PTVE having large particle diameters. The average particle diameter of the PTVE after the particle diameter adjustment by the classification was 21.8 μm. Then, 7 g of the PTVE after the particle diameter adjustment and 2.5 g of a vapor grown carbon fiber (VGCF) were added to a three-neck round-bottom flask of 200 mL under an atmosphere of argon and were homogeneously stirred. Then, the mixture was heated at 135° C. in an oil bath under stirring. The mixture was heated and stirred for 10 min, and thereafter quenched in liquid nitrogen to obtain a polyradical compound-electric conductivity-imparting agent composite (c) having a weight ratio of PTVE:VGCF=70:25. By observation of the obtained composite (c) by an electron microscope, it is confirmed that the composite was formed in which VGCF adhered to the PTVE particle surface and a part thereof penetrated into the interior of the PTVE.

Producing Example 4

A polyradical compound-electric conductivity-imparting agent composite using a polyradical compound (PTVE, the same as that used in Producing Example 1) having a partial structure represented by the formula (2) was produced by a producing scheme described below.

The polyradical compound (PTVE) was pulverized for 24 hours using an automatic agate mortar. The PTVE after the pulverization had an average particle diameter of 24.1 μm. Then, 14 g of the PTVE and 5 g of a vapor grown carbon fiber (VGCF) were added to a twin screw kneading extruder, and kneaded at 135° C. Then, the composite obtained by the kneading extruder was pulverized using an agate mortar. Then, the particles were classified using a SUS sieve having a mesh size of 50 μm to remove large particle diameters and to obtain a polyradical compound-electric conductivity-imparting agent composite (d) having a weight ratio of PTVE:VGCF=70:25. By observation of the obtained composite (d) by an electron microscope, it is confirmed that the composite was formed in which VGCF adhered to the PTVE particle surface and a part thereof penetrated into the interior of the PTVE.

Example 1

40 g of pure water was weighed in a small homogenizer vessel, and 400 mg of a carboxy methylcellulose (CMC) was added thereto, and stirred for 30 min and completely dissolved therein. Then, 100 mg of a polytetrafluoroethylene (PTFE) was added thereto, and further stirred for 30 min and completely dispersed therein. 9.5 g of the polyradical compound-electric conductivity-imparting agent composite (a) (PTVE/VGCF weight ratio=7:2.5) produced in Producing Example 1 was added thereto, and stirred for 30 min until the whole became homogeneous to obtain a slurry. The obtained slurry was applied on an aluminum foil, and dried at 50° C. to fabricate a cathode. The cathode layer had a thickness of 100 μm. The fabricated electrode did not have peelings, cracks and the like observed, and had a uniform surface. The fabricated electrode was punched into a circle of 12 mm in diameter to form an electrode for a coin battery. The electrode had a weight of 9.1 mg.

Then, the obtained electrode was immersed in an electrolytic solution, and impregnated in voids in the electrode with the electrolytic solution. The electrolytic solution used was a mixed solution of ethylene carbonate and diethyl carbonate (volume ratio=3:7) containing a LiBETI ($Li(C_2F_5SO_2)_2N$) electrolyte salt of 1.0 mol/L. The electrode impregnated with the electrolytic solution was put on a cathode current collector (aluminum foil); and a polypropylene porous film separator impregnated with the same electrolytic solution was laminated thereon. Further, a copper foil with a lithium metal foil to be a anode attached on one surface of the copper foil was laminated thereon; and respective aluminum exterior packages (made by Hohsen) were stacked on the cathode side and the anode side in the state that an insulating packing was disposed on the periphery. The resultant laminate was pressed by a caulking machine to make a hermetic coin battery using the polyradical compound complex-electric conductivity-imparting agent composite as the cathode active material and graphite as the anode active material.

(Charge/Discharge Tests)

The coin battery was charged at a constant current of 0.1 mA until the voltage reached 4.0 V; and the discharge capacity when the battery was thereafter discharged at a constant current of 0.1 mA until the voltage reached 3.0 V was measured. The discharge capacity at this time was determined as a value normalized as per weight of the cathode active material. Further, the charge/discharge was repeated 50 times and the discharge capacity after the 50 cycles was measured with respect to the first discharge capacity. Separately, the battery was charged at a constant current of 0.1 mA until the voltage reached 4.0 V; and the discharge capacity when the battery was thereafter discharged at a constant current of 1 mA until the voltage reached 3.0 V was measured as a ratio relative to the discharge capacity in the case of the discharge at 0.1 mA. The results are shown in Table 1 shown later.

Example 2

A coin battery was fabricated by the same method as in Example 1, except for using the polyradical compound-electric conductivity-imparting agent composite (b) produced in Producing Example 2 in place of the polyradical compound-electric conductivity-imparting agent composite (a). The fabricated electrode did not have peelings and cracks observed, and had a uniform surface. The cathode of the coin battery had a weight of 10.1 mg. The results of the charge/discharge tests thereafter performed as in Example 1 are shown in Table 1

Example 3

A coin battery was fabricated by the same method as in Example 1, except for using the polyradical compound-electric conductivity-imparting agent composite (c) produced in Producing Example 3 in place of the polyradical compound-electric conductivity-imparting agent composite (a). The fabricated electrode did not have peelings and cracks observed, and had a uniform surface. The cathode of the coin battery had a weight of 9.5 mg. The results of the charge/discharge tests thereafter performed as in Example 1 are shown in Table 1.

Example 4

A coin battery was fabricated by the same method as in Example 1, except for using the polyradical compound-electric conductivity-imparting agent composite (d) produced in Producing Example 3 in place of the polyradical compound-electric conductivity-imparting agent composite (a). The fabricated electrode did not have peelings and cracks observed, and had a uniform surface. The cathode of the coin battery had a weight of 9.5 mg. The results of the charge/discharge tests thereafter performed as in Example 1 are shown in Table 1.

Comparative Example 1

40 g of pure water was weighed in a small homogenizer vessel; and 400 mg of a carboxy methylcellulose (CMC) was added thereto, and stirred for 30 min and completely dissolved therein. Then, 100 mg of a polytetrafluoroethylene (PTFE) was added thereto, and further stirred for 30 min and completely dispersed therein. Then, 2.5 g of VGCF was added thereto, and stirred for 1 hour and completely dispersed therein. Further, 7 g of the polyradical compound having a partial structure represented by the formula (2) (PTVE, the same as that used in Producing Example 1) was added thereto, and stirred for 30 min till the whole became homogeneous to obtain a slurry. A coin battery was fabricated by the same method as in Example 1, except for using this slurry. The fabricated electrode did not have peelings and cracks observed, and had a uniform surface. The cathode of the coin battery had a weight of 8.8 mg. The results of the charge/discharge tests thereafter performed as in Example 1 are shown in Table 1.

Comparative Example 2

The polyradical compound (PTVE, the same as that used in Producing Example 1) having a partial structure represented by the formula (2) was pulverized for 24 hours using an automatic agate mortar. Then, the particles were classified using a SUS sieve of 50 μm in mesh size to remove PTVE having large particle diameters. The average particle diameter of the PTVE after the particle diameter adjustment by the classification was 21.8 μm. Then, 7 g of the PTVE after the particle diameter adjustment and 2.5 g of a vapor grown carbon fiber (VGCF) were homogeneously stirred to obtain a polyradical compound-electric conductivity-imparting agent mixture (e).

A coin battery was fabricated by the same method as in Example 1, except for using the polyradical compound-electric conductivity-imparting agent mixture (e) in place of polyradical compound-electric conductivity-imparting agent composite (a). The fabricated electrode did not have peelings and cracks observed, and had a uniform surface. The cathode of the coin battery had a weight of 9.1 mg. The results of the charge/discharge tests thereafter performed as in Example 1 are shown in Table 1.

Comparative Example 3

A polyradical compound-electric conductivity-imparting agent composite (f) was obtained by the same method as in Producing Example 11 except for altering the heating temperature from 135° C. to 180° C. By observation of the obtained composite (f) by an electron microscope, it is confirmed that the composite was formed in which VGCF was adhered to the PTVE particle surface and a part thereof penetrated into the interior of the PTVE.

A coin battery was fabricated by the same method as in Example 1, except for using the polyradical compound-electric conductivity-imparting agent composite (f) in place of the polyradical compound-electric conductivity-imparting agent composite (a). The fabricated electrode did not have peelings and cracks observed, and had a uniform surface. The cathode of the coin battery had a weight of 8.4 mg. The results of the charge/discharge tests thereafter performed as in Example 1 are shown in Table 1.

TABLE 1

|  | first discharge capacity [mAh/g] | discharge capacity after 50 cycles/first discharge capacity [%] | discharge capacity at 1 mA/discharge capacity at 0.1 mA [%] |
| --- | --- | --- | --- |
| Example 1 | 117 | 95 | 95 |
| Example 2 | 115 | 96 | 90 |
| Example 3 | 109 | 87 | 93 |
| Example 4 | 120 | 94 | 96 |
| Comparative Example 1 | 90 | 60 | 81 |
| Comparative Example 2 | 91 | 56 | 76 |
| Comparative Example 3 | 9 | — | 0 |

The batteries produced in Examples 1 to 4, as compared with the batteries producing in Comparative Examples 1 to 3, were improved in the first discharge capacity, suppressed in the capacity decrease due to cycles, and improved in the discharge characteristics at a larger current. That is, it was confirmed that heating and mixing an electric conductivity-imparting agent and a polyradical compound at a predetermined temperature to make a composite improves the energy density and the output density and improves the cycle stability due to improvements in the efficiency and stability of the active material utilization.

The battery shown in Example 1 was improved in the first discharge capacity as compared with Comparative Example 2. That is, it was confirmed that heating and mixing a polyradical compound and an electric conductivity-imparting agent to make a composite is more improved in the energy density than physically mixing them.

The battery shown in Example 1 was improved in all characteristics as compared with Comparative Example 3. If the process temperature to form a composite is high as in Comparative Example 3, the polyradical compound deteriorates, providing a battery which does not charge and discharge. Therefore, this indicates the importance of the heating temperature.

The battery shown in Example 1 was improved in the discharge characteristics at a large current as compared with Example 2. This is considered because making small the particle diameter of the polyradical compound before the heating and mixing increases the contact area with the electric conductivity-imparting agent.

The present application claims the priority based on Japanese Patent Application No. 2007-014997, filed on Jan. 25, 2007, all the disclosure of which is incorporated herein by reference.

The invention claimed is:

1. A method for producing a polyradical compound-conductive material composite, comprising:
dry-mixing a material consisting of a polyradical compound and a conductive material at a temperature of not less than the softening temperature of the polyradical compound and less than the decomposition temperature thereof wherein said dry-mixing is done without any solvent.

2. The method for producing a polyradical compound-conductive material composite according to claim 1, wherein the polyradical compound has a partial structure represented by the following general formula (1):

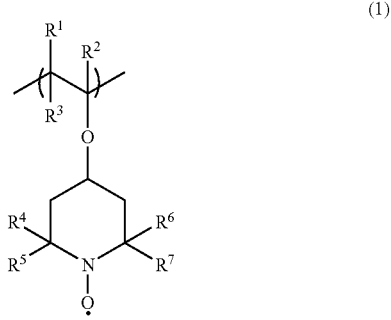

wherein $R^1$ to $R^3$ are each independently hydrogen atom or methyl group; and $R^4$ to $R^7$ are each independently an alkyl group having 1 to 3 carbon atoms.

3. The method for producing a polyradical compound-conductive material composite according to claim 1, wherein the conductive material is a carbon material.

4. The method for producing a polyradical compound-conductive material composite according to claim 3, wherein the conductive material is a carbon fiber.

5. The method for producing a polyradical compound-conductive material composite according to claim 1, wherein the mixing is carried out under an inert gas atmosphere.

6. The method for producing a polyradical compound-conductive material composite according to claim 1, wherein the mixing is carried out for not more than 3 hours.

7. The method for producing a polyradical compound-conductive material composite according to claim 1, wherein the polyradical compound powder before the mixing has an average particle diameter of not less than 0.02 μm and not more than 100 μm.

8. The method for producing a polyradical compound-conductive material composite according to claim 2, wherein the conductive material is a carbon material.

9. The method for producing a polyradical compound-conductive material composite according to claim 2, wherein the mixing is carried out under an inert gas atmosphere.

10. The method for producing a polyradical compound-conductive material composite according to claim 3, wherein the mixing is carried out under an inert gas atmosphere.

11. The method for producing a polyradical compound-conductive material composite according to claim 4, wherein the mixing is carried out under an inert gas atmosphere.

12. The method for producing a polyradical compound-conductive material composite according to claim 2, wherein the mixing is carried out for not more than 3 hours.

13. The method for producing a polyradical compound-conductive material composite according to claim 3, wherein the mixing is carried out for not more than 3 hours.

14. The method for producing a polyradical compound-conductive material composite according to claim 5, wherein the mixing is carried out for not more than 3 hours.

15. The method for producing a polyradical compound-conductive material composite according to claim 6, wherein the mixing is carried out for not more than 3 hours.

16. The method for producing a polyradical compound-conductive material composite according to claim 2, wherein the polyradical compound powder before the mixing has an average particle diameter of not less than 0.02 μm and not more than 100 μm.

* * * * *

UNITED STATES PATENT AND TRADEMARK OFFICE
CERTIFICATE OF CORRECTION

PATENT NO.        : 8,475,956 B2                                        Page 1 of 1
APPLICATION NO. : 12/523762
DATED             : July 2, 2013
INVENTOR(S)       : Kusachi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 798 days.

Signed and Sealed this
Eighth Day of September, 2015

Michelle K. Lee
*Director of the United States Patent and Trademark Office*